United States Patent
Danielson

(10) Patent No.: US 10,279,733 B1
(45) Date of Patent: May 7, 2019

(54) TAILGATING DETECTION AND MONITORING ASSEMBLY

(71) Applicant: Aron Danielson, Pennsbutg, PA (US)

(72) Inventor: Aron Danielson, Pennsbutg, PA (US)

( * ) Notice: Subject to any disclaimer, the term of this patent is extended or adjusted under 35 U.S.C. 154(b) by 0 days.

(21) Appl. No.: 15/947,542

(22) Filed: Apr. 6, 2018

(51) Int. Cl.
| | |
|---|---|
| B60Q 1/30 | (2006.01) |
| B60Q 1/50 | (2006.01) |
| B60Q 9/00 | (2006.01) |
| B60R 1/12 | (2006.01) |
| B60R 11/04 | (2006.01) |
| B60Q 1/52 | (2006.01) |
| B60Q 5/00 | (2006.01) |

(52) U.S. Cl.
CPC ............ *B60Q 1/503* (2013.01); *B60Q 1/302* (2013.01); *B60Q 1/525* (2013.01); *B60Q 5/006* (2013.01); *B60Q 9/008* (2013.01); *B60R 1/12* (2013.01); *B60R 11/04* (2013.01); *B60R 2001/1253* (2013.01); *B60R 2300/70* (2013.01); *B60R 2300/8066* (2013.01)

(58) Field of Classification Search
CPC ........ B60Q 9/008; B60Q 5/006; B60Q 1/146; G06K 9/00791; G06K 9/00805
USPC .......................................................... 340/435
See application file for complete search history.

(56) References Cited

U.S. PATENT DOCUMENTS

| | | | | |
|---|---|---|---|---|
| 5,166,681 | A * | 11/1992 | Bottesch ................... | G01S 3/78 180/167 |
| 6,737,963 | B2 | 5/2004 | Gutta et al. | |
| D495,812 | S | 9/2004 | Hilborn et al. | |
| 7,057,501 | B1 * | 6/2006 | Davis ....................... | B60Q 1/46 340/435 |
| 7,327,238 | B2 * | 2/2008 | Bhogal ................ | G08G 1/0175 340/435 |
| 7,554,435 | B2 * | 6/2009 | Tengler .................... | B60Q 1/44 340/425.5 |
| 7,782,228 | B2 * | 8/2010 | Maxwell ................ | G08G 1/164 340/435 |
| 2006/0164221 | A1 * | 7/2006 | Jensen ................... | B60Q 1/525 340/435 |
| 2007/0159311 | A1 * | 7/2007 | Schober ................. | B60Q 1/525 340/435 |
| 2010/0302371 | A1 | 12/2010 | Abrams | |
| 2013/0235204 | A1 | 9/2013 | Buschmann | |
| 2015/0307025 | A1 | 10/2015 | Hedley | |

* cited by examiner

*Primary Examiner* — Eric Blount

(57) ABSTRACT

A tailgating detection and monitoring assembly for a vehicle includes a sensor, a display, and a rear-facing imager that are coupled to a vehicle. The sensor and the display are rear-facing. A computer is operationally coupled to the rear-facing imager, the sensor, the display, and an onboard control system of the vehicle. Programming code that is positioned on the computer enables the computer to actuate the sensor to determine a separation between the vehicle and a following vehicle, positioning an automatic braking system of the vehicle to determine a tailgating event. The programming code enables the computer to selectively actuate the display to present a notification to a driver of the following vehicle and to selectively actuate the rear-facing imager to capture an image of the tailgating event. The onboard control system is positioned to communicate the image of the tailgating event to a law enforcement agency via the internet.

12 Claims, 5 Drawing Sheets

TAILGATING DETECTION AND MONITORING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to monitoring assemblies and more particularly pertains to a new monitoring assembly for a vehicle.

BRIEF SUMMARY OF THE INVENTION

An embodiment of the disclosure meets the needs presented above by generally comprising a sensor, a display, and a rear-facing imager that are coupled to a vehicle. The sensor and the display are rear-facing. A computer is operationally coupled to the rear-facing imager, the sensor, the display, and an onboard control system of the vehicle. Programming code that is positioned on the computer enables the computer to actuate the sensor to determine a separation between the vehicle and a following vehicle, positioning an automatic braking system of the vehicle to determine a tailgating event. The programming code enables the computer to selectively actuate the display to present a notification to a driver of the following vehicle and to selectively actuate the rear-facing imager to capture an image of the tailgating event. The onboard control system is positioned to communicate the image of the tailgating event to a law enforcement agency via the internet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
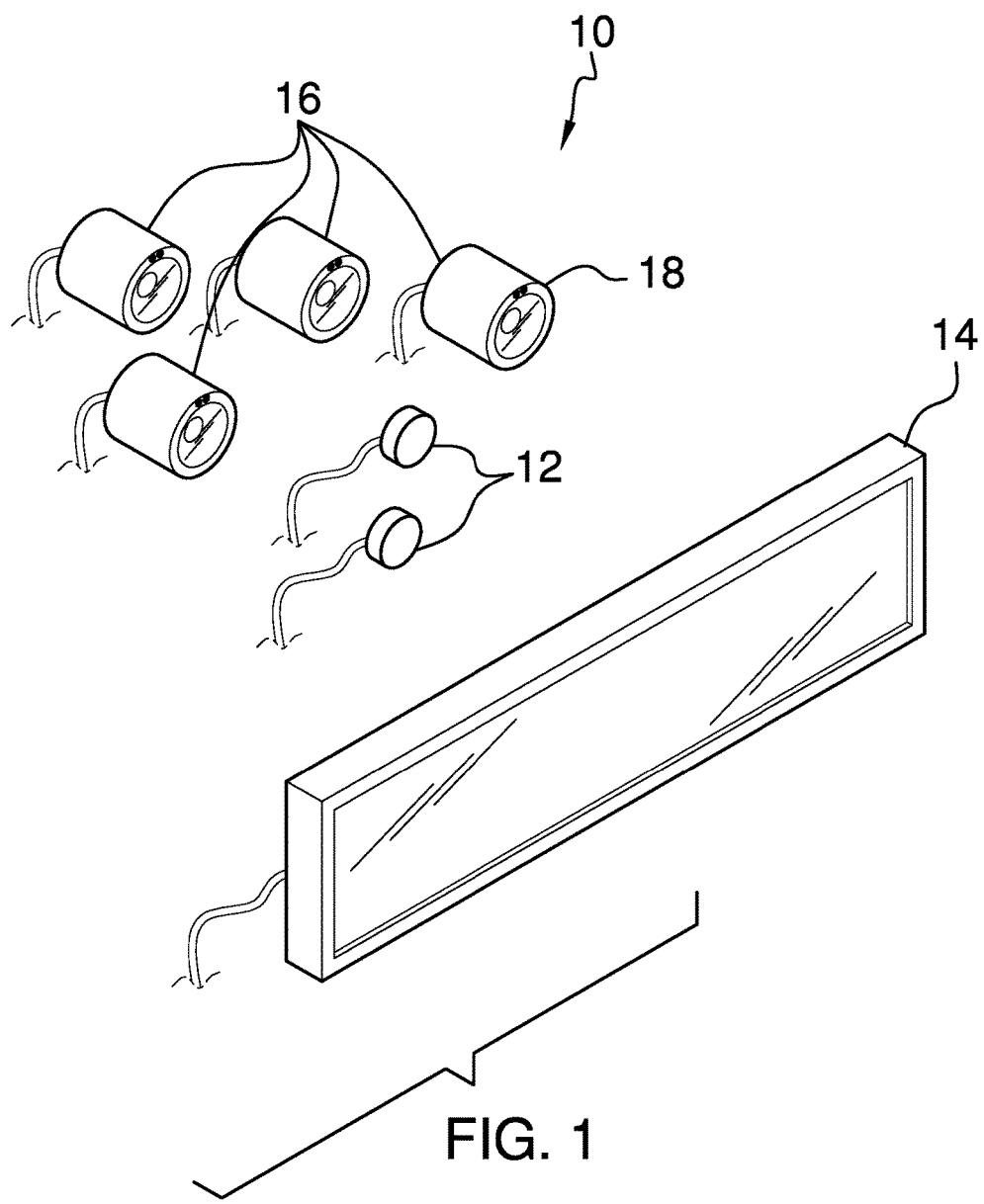
FIG. 1 is an isometric perspective view of a tailgating detection and monitoring assembly according to an embodiment of the disclosure.
Figure 2:
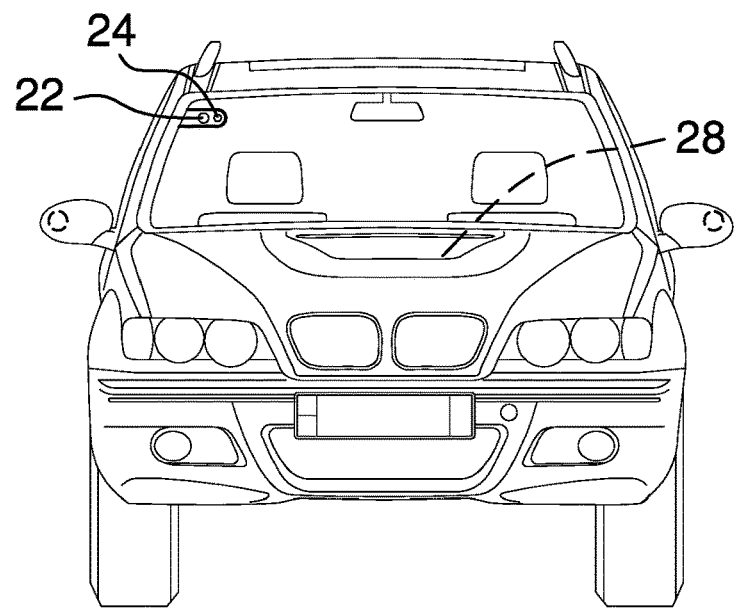
FIG. 2 is a front view of an embodiment of the disclosure.
Figure 3:
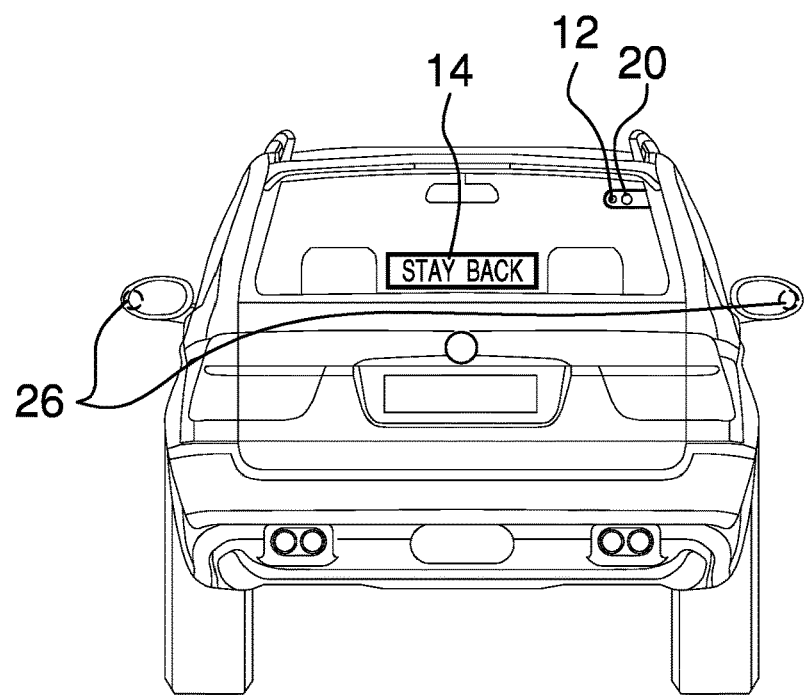
FIG. 3 is a back view of an embodiment of the disclosure.
Figure 4:
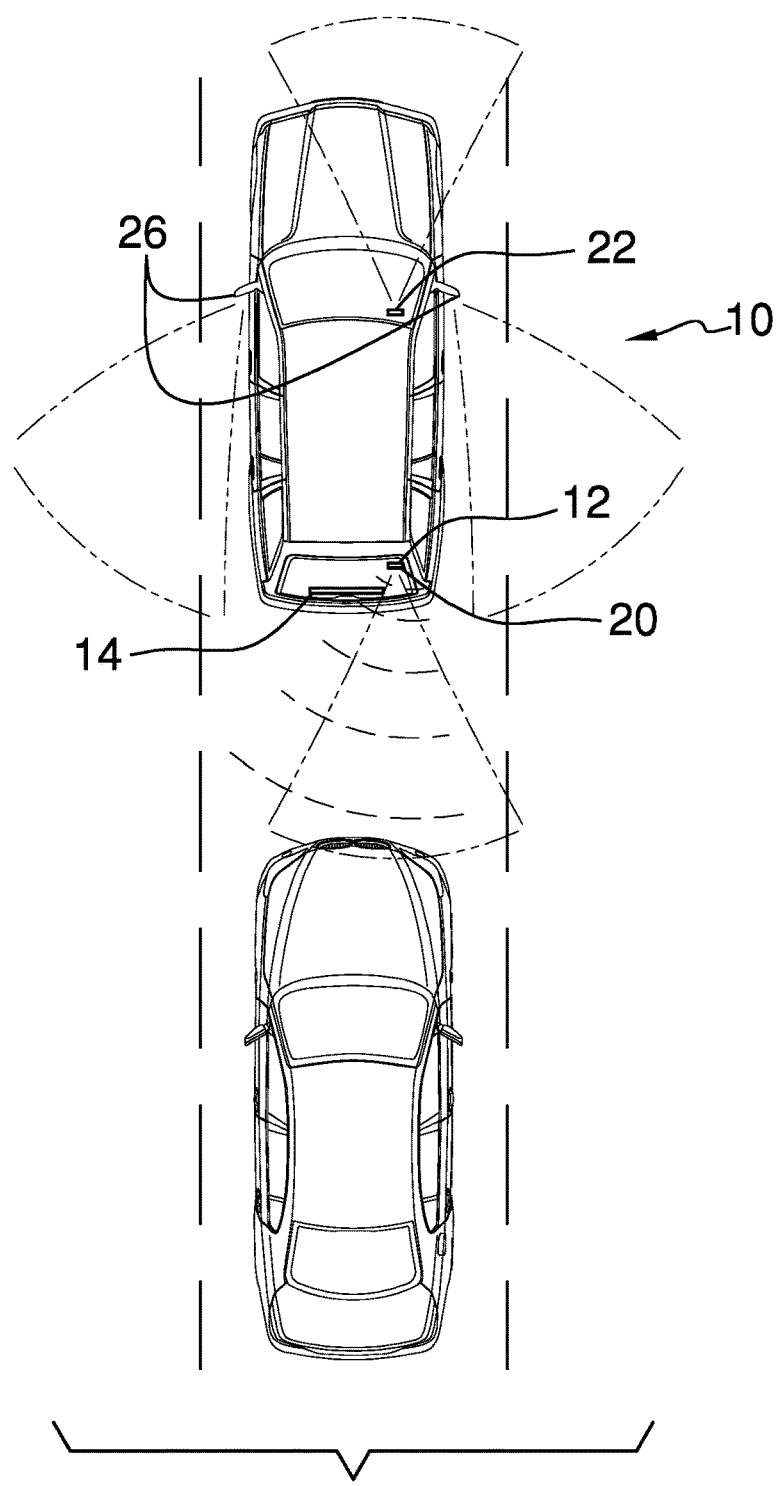
FIG. 4 is an in-use view of an embodiment of the disclosure.
Figure 5:
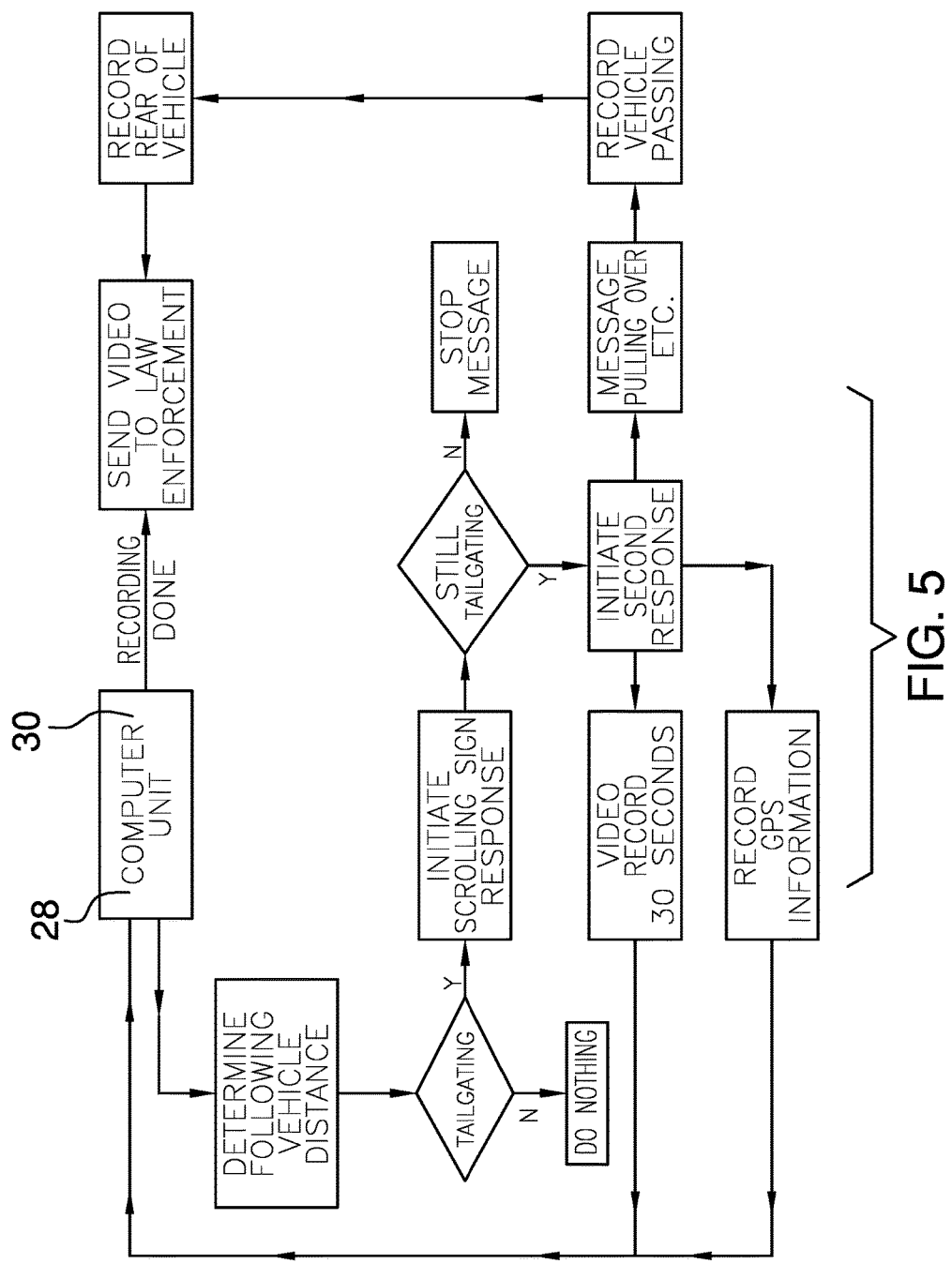
FIG. 5 is a flow diagram of an embodiment of the disclosure.
Figure 6:
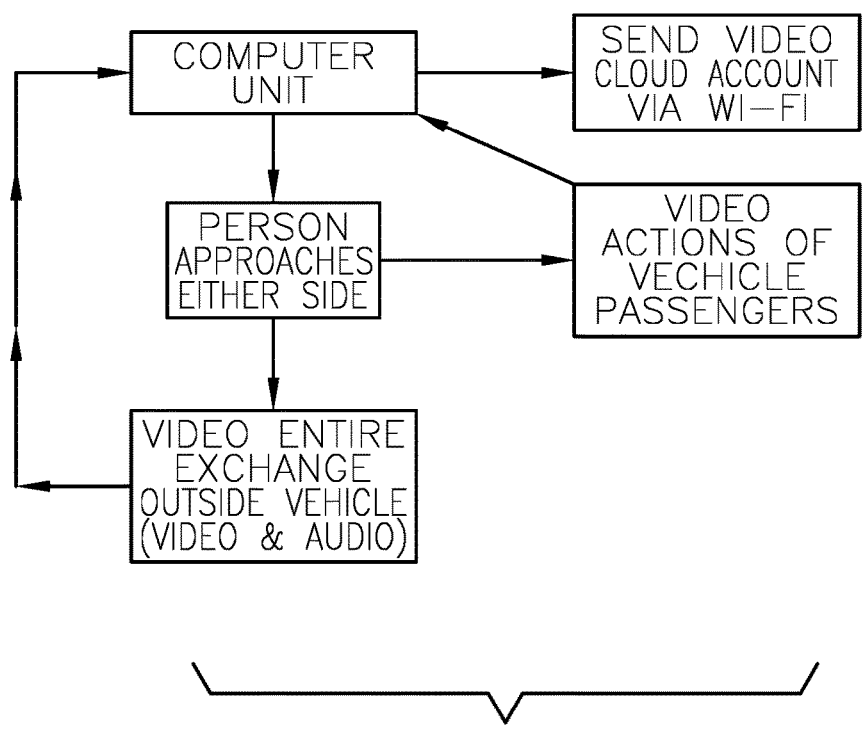
FIG. 6 is a flow diagram view of an embodiment of the disclosure.

With reference now to the drawings, and in particular to FIGS. 1 through 6 thereof, a new monitoring assembly embodying the principles and concepts of an embodiment of the disclosure and generally designated by the reference numeral 10 will be described.

As best illustrated in FIGS. 1 through 6, the tailgating detection and monitoring assembly 10 generally comprises a sensor 12 that is coupled to a vehicle. The vehicle is equipped with an onboard control system that has internet connectivity, an automatic braking system, and a blind spot detection system. The sensor 12 is rear-facing and is configured to selectively measure a separation the vehicle and a following vehicle. The sensor 12 is coupled to a rear window of the vehicle. The sensor 12 may utilize lidar, radar, or imaging, as is well known to those skilled in the art.

A display 14 is coupled the rear window of the vehicle. The display 14 is rear-facing and is configured to selectively present a notification to a driver of the following vehicle. Notifications may include "Stay Back", "You are Following to Close", "Video Starting" and a countdown time, "I will be pulling over to allow you to pass", as well as other notifications.

A plurality of imagers 16 is coupled to the vehicle. Each imager 16 comprises an audio video camera 18 so that the imager 16 can capture both audio and video. The plurality of imagers 16 comprises a rear-facing imager 20 that is configured to selectively capture an image of the following vehicle. The rear-facing imager 20 is coupled to the rear window of the vehicle.

The plurality of imagers 16 also comprises a front-facing imager 22 and an interior imager 24. The front-facing imager 22 is configured to selectively capture an image of the following vehicle as it passes the vehicle. The front-facing imager 22 is intended to capture the license plate of the following vehicle. The interior imager 24 is configured to selectively capture an image of the occupants of the vehicle. The interior imager 24 and the front-facing imager 22 are coupled to a windshield of the vehicle.

The plurality of imagers 16 also comprises a pair of side-facing imagers 26. Each side-facing imager 26 is coupled to a respective side mirror of the vehicle. Each side-facing imager 26 is configured to selectively capture an image of a person that is positioned in a respective blind spot of the vehicle. The side-facing imagers 26 and the interior imager 24 would be utilized to record audio and video images of an encounter between the occupants of the vehicle and the driver of the following vehicle, should the driver of the following vehicle approach the vehicle after it has pulled over.

A computer 28 is operationally coupled to the onboard control system, the sensor 12, the display 14, and the plurality of imagers 16. The computer 28 may be integral to the onboard control system of the vehicle.

Programming code 30 that is positioned on the computer 28 enables the computer 28 to actuate the sensor 12 to determine the separation between the vehicle and the following vehicle, positioning the automatic braking system to determine a tailgating event. The programming code 30 also enables the computer 28 to selectively actuate the display 14 to present the notification to the driver of the following vehicle.

The programming code 30 also enables the computer 28 to selectively actuate the rear-facing imager 20 to capture the image of the tailgating event. The programming code 30 also enables the computer 28 to signal the onboard control system to communicate the image of the tailgating event to a law enforcement agency.

The programming code 30 also enables the computer 28 to selectively actuate the front-facing imager 22 to capture the image of the following vehicle as it passes the vehicle. The programming code 30 also enables the computer 28 to selectively actuate the pair of side-facing imagers 26 to capture the image of the person in the respective blind spot.

The programming code 30 also enables the computer 28 to selectively actuate the interior imager 24 to capture the image of the occupants of the vehicle. The programming code 30 also enables the computer 28 to signal the onboard control system to communicate a location and a speed of the vehicle during the tailgating event to the law enforcement agency.

In use, the programming code 30 that is positioned on the computer 28 enables the computer 28 to actuate the sensor 12 to determine the separation between the vehicle and the following vehicle, positioning the automatic braking system to determine the tailgating event. The computer 28 selectively actuates the display 14 to present the notification to the driver of the following vehicle. The computer 28 selectively actuates the rear facing imager 20 to capture the image of the tailgating event. The computer 28 selectively actuates the front-facing imager 22 to capture the image of the following vehicle as it passes the vehicle. The computer 28 selectively actuates the pair of side-facing imagers 26 to capture the image of the person in the respective blind spot. The computer 28 selectively actuates the interior imager 24 to capture the image of the occupants of the vehicle. The computer 28 signals the onboard control system to communicate the images, the location, and the speed of the vehicle during the tailgating event to the law enforcement agency.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tailgating detection and monitoring assembly comprising:
   a sensor coupled to a vehicle equipped with an automatic braking system and an onboard control system having internet connectivity, said sensor being rear-facing such that said sensor is configured for selectively measuring a separation the vehicle and a following vehicle, the vehicle having a blind spot detection system;
   a display coupled to the vehicle, said display being rear-facing such that said display is configured for selectively presenting a notification to a driver of the following vehicle;
   a plurality of imagers coupled to the vehicle, said plurality of imagers comprising a rear-facing imager such that said rear-facing imager is configured for selectively capturing an image of the following vehicle, said plurality of imagers comprising a pair of side-facing imagers wherein each said side-facing imager is configured for selectively capturing an image of a person in a respective blind spot of the vehicle, said plurality of imagers comprising an interior imager wherein said interior imager is configured for selectively capturing an image of the occupants of the vehicle;
   a computer operationally coupled to the onboard control system, said sensor, said display, and said plurality of imagers;
   programming code positioned on said computer enabling said computer for actuating said sensor for determining the separation between the vehicle and the following vehicle positioning the automatic braking system for determining a tailgating event;
   programming code positioned on said computer enabling said computer for selectively actuating said display for presenting the notification to the driver of the following vehicle;
   programming code positioned on said computer enabling said computer for selectively actuating said rear-facing for capturing the image of the tailgating event and for signaling the onboard control system for communicating the image of the tailgating event to a law enforcement agency;
   programming code positioned on said computer enabling said computer for selectively actuating said pair of side-facing imagers for capturing the image of the person in the respective blind spot; and programming code positioned on said computer enabling said computer for selectively actuating said interior imager for capturing the image of the occupants of the vehicle.

2. The assembly of claim 1, further including said sensor being coupled to a rear window of the vehicle.

3. The assembly of claim 1, further including said display being coupled to a rear window of the vehicle.

4. The assembly of claim 1, further including each said imager comprising an audio video camera.

5. The assembly of claim 1, further including said rear-facing imager being coupled to a rear window of the vehicle.

6. The assembly of claim 1, further including said computer being integral to the onboard control system of the vehicle.

7. The assembly of claim 1, further comprising:
said plurality of imagers comprising a front-facing imager wherein said front-facing imager is configured for selectively capturing an image of the following vehicle as it passes the vehicle; and
programming code positioned on said computer enabling said computer for selectively actuating said front-facing imager for capturing the image of the following vehicle as it passes the vehicle.

8. The assembly of claim 7, further including said front-facing imager being coupled to a windshield of the vehicle.

9. The assembly of claim 1, further including each said side-facing imager being coupled to a respective side mirror of the vehicle.

10. The assembly of claim 1, further including said interior imager being coupled to a windshield of the vehicle.

11. The assembly of claim 1, further including programming code positioned on said computer enabling said computer for signaling the onboard control system for communicating a location and a speed of the vehicle during the tailgating event to the law enforcement agency.

12. A tailgating detection and monitoring assembly comprising:
a sensor coupled to a vehicle equipped with an onboard control system having internet connectivity, an automatic braking system, and a blind spot detection system, said sensor being rear-facing such that said sensor is configured for selectively measuring a separation the vehicle and a following vehicle, said sensor being coupled to a rear window of the vehicle;
a display coupled to the vehicle, said display being rear-facing such that said display is configured for selectively presenting a notification to a driver of the following vehicle, said display being coupled to the rear window of the vehicle;
a plurality of imagers coupled to the vehicle, said plurality of imagers comprising a rear-facing imager such that said rear-facing imager is configured for selectively capturing an image of the following vehicle, each said imager comprising an audio video camera, said plurality of imagers comprising a front-facing imager wherein said front-facing imager is configured for selectively capturing an image of the following vehicle as it passes the vehicle, said plurality of imagers comprising a pair of side-facing imagers wherein each said side-facing imager is configured for selectively capturing an image of a person in a respective blind spot of the vehicle, said plurality of imagers comprising an interior imager wherein said interior imager is configured for selectively capturing an image of the occupants of the vehicle, said rear-facing imager being coupled to the rear window of the vehicle, each said side-facing imager being coupled to a respective side mirror of the vehicle, said interior imager and said front-facing imager being coupled to a windshield of the vehicle;
a computer operationally coupled to the onboard control system, said sensor, said display, and said plurality of imagers, said computer being integral to the onboard control system of the vehicle;
programming code positioned on said computer enabling said computer for actuating said sensor for determining the separation between the vehicle and the following vehicle positioning the automatic braking system for determining a tailgating event;
programming code positioned on said computer enabling said computer for selectively actuating said display for presenting the notification to the driver of the following vehicle;
programming code positioned on said computer enabling said computer for selectively actuating said rear-facing for capturing the image of the tailgating event and for signaling the onboard control system for communicating the image of the tailgating event to a law enforcement agency;
programming code positioned on said computer enabling said computer for selectively actuating said front-facing imager for capturing the image of the following vehicle as it passes the vehicle;
programming code positioned on said computer enabling said computer for selectively actuating said pair of side-facing imagers for capturing the image of the person in the respective blind spot;
programming code positioned on said computer enabling said computer for selectively actuating said interior imager for capturing the image of the occupants of the vehicle;
programming code positioned on said computer enabling said computer for signaling the onboard control system for communicating a location and a speed of the vehicle during the tailgating event to the law enforcement agency; and
wherein said programming code is positioned on said computer such that said computer is enabled for:
actuating said sensor for determining the separation between the vehicle and the following vehicle positioning the automatic braking system for determining the tailgating event,
selectively actuating said display for presenting the notification to the driver of the following vehicle,
selectively actuating said rear-facing imager for capturing the image of the tailgating event,
selectively actuating said front-facing imager for capturing the image of the following vehicle as it passes the vehicle,
selectively actuating said pair of side-facing imagers for capturing the image of the person in the respective blind spot,
selectively actuating said interior imager for capturing the image of the occupants of the vehicle, and
signaling the onboard control system for communicating the images, the location, and the speed of the vehicle during the tailgating event to the law enforcement agency.

* * * * *